Jan. 27, 1931.     J. D. HOOKS     1,790,423
ROLLER SKATE
Filed Oct. 23, 1929
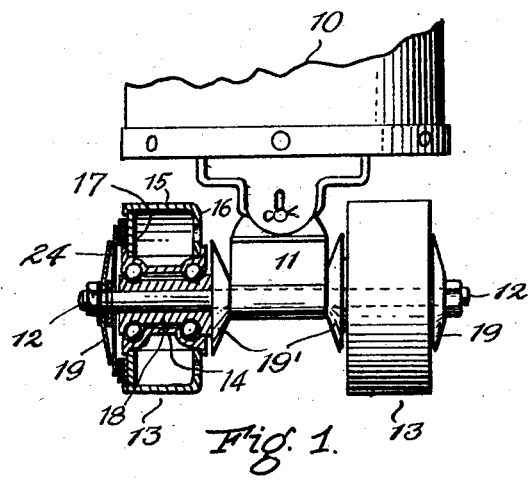
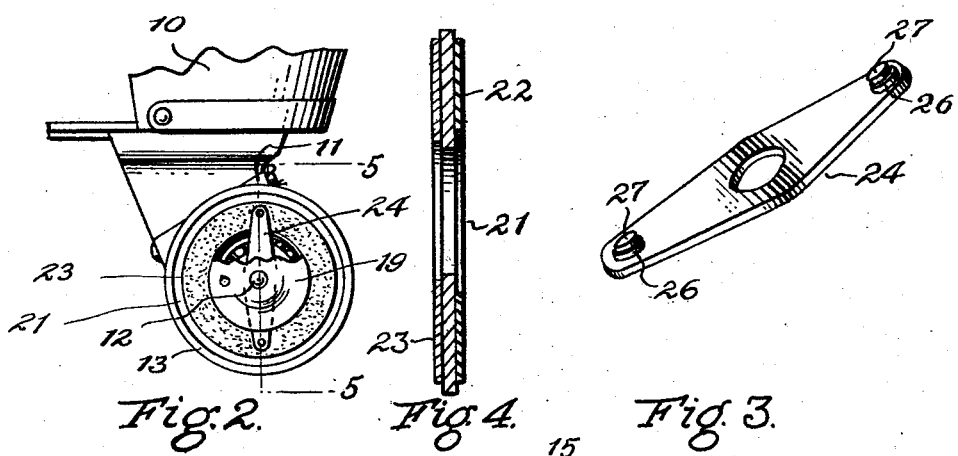
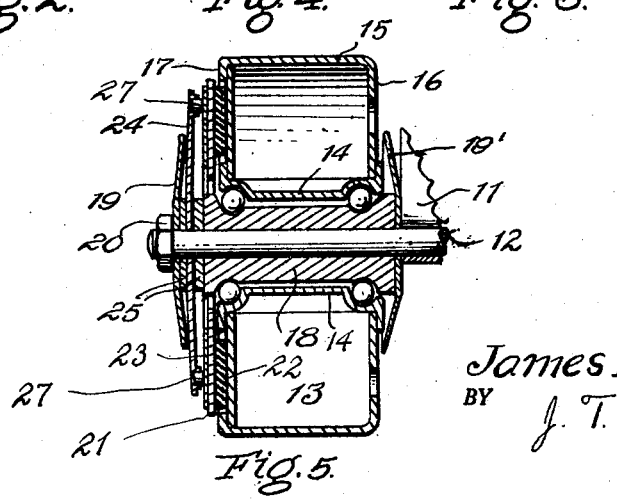
INVENTOR.
James D. Hooks
BY
J. T. Newton
ATTORNEY.

Patented Jan. 27, 1931

1,790,423

UNITED STATES PATENT OFFICE

JAMES D. HOOKS, OF MACON, GEORGIA

ROLLER SKATE

Application filed October 23, 1929. Serial No. 401,857.

This invention relates to an improvement in roller skates, more particularly to the wheels thereof. It has for its object the provision of means for mounting on a wheel and its axle a friction element and a pyrophoric element so that when the wheel is rotated the two elements rub together to produce a sparkling pyrotechnic effect. The following is a detail description of the invention, which is illustrated by the accompanying drawings.

In the drawings, in which similar reference characters designate corresponding parts, Figure 1 is a rear elevation, partly broken and partly in section, of a roller skate embodying the invention.

Figure 2 is a side elevation of the same, partly broken away.

Figure 3 is a detail perspective view, showing the member for supporting the pyrophoric element.

Figure 4 is a detail view, showing a cross section of the friction washer.

Figure 5 is an enlarged detail view, showing a cross-section of the skate wheel.

Referring to the drawings in detail, 10 designates the heel part of a roller skate, to the under side of which is pivoted the housing 11 carrying the axle 12 on which are mounted the wheels 13. As the wheels are of like construction, only one will be described in detail. The wheel, proper, is of well known construction. It comprises a hub 14 and an angle member forming the tread 15 and a side 16 fixed on the inner end of the hub. The other side of the wheel is formed by a plate 17 fixed on the outer end of the hub and within the outer edge of the tread. The hub is journaled on the sleeve 18 mounted on an end of the axle 12, with the usual ball bearings interposed between the sleeve and hub. The sleeve is clamped on the axle between the washers 19, 19' at the opposite ends of the sleeve, a nut 20 being turned on the outer end of the axle to hold the intervening parts against the housing 11. The foregoing is of well known construction.

Abutting the outer end of the wheel is the annular disc 21 loosely fitting the outer end of the sleeve 18. On the inner face of the disc is cemented a layer of rubber fabric 22 to contact with the adjacent side of the wheel. The fabric fits within the annular space between the flanges of the tread 15 and of the hub 14 overlapping the edges of the plate 17 included in the outer side or end of the wheel. On the outer face of the disc 21 is cemented a layer of frictional material 23, such as emery. On the outer end of the axle is the cross-bar 24 of spring metal. This cross-bar is clamped between the end washer 19 and the end of the sleeve 18, adjusting washers 25 being placed on opposite sides of the cross bar to position the latter. The washer 19, which is concave on its inner face, bears against the extremities of the cross-bar. In the ends of the cross-bar are sockets 26 in which are seated cylindrical blocks of pyrophoric 27 to be pressed by the arms of the cross-bar against the frictional surface 23 of the disc 21. By means of the washers 25, which may be of various thickness, the position of the end washer 19 can be adjusted on the shaft 12 to vary the pressure exerted by the arms of the cross-bar 24 and of the pyrophoric blocks 27 carried by them against the frictional surface 23 of the disc 21.

In the operative assemblage of the several parts of the wheel, the sleeve 18 is held against rotation on the shaft 12 and the cross-bar 24 is clamped to the end of the sleeve. The wheel 13 is freely rotatable on the sleeve 18 and as it turns the frictional contact between the same and the fabric layer 22 tends to turn the disc 21 with the wheel. The frictional engagement between the wheel and the disc depends on the pressure exerted by the spring arms of the cross-bar 24, pressing the pyrophoric blocks 27 against the frictional layer 23 on the outer face of the disc. The pressure of the spring arms exerted through the pyrophoric blocks presses the disc inwardly to effect a frictional engagement between the fabric layer fast on the inner face of the disc and the wheel. The pressure of the arms can be regulated by an adjustment of the washers 25 and the nut 20, so arranged, that when the wheel is rotated in skating the disc is rotated with it. As the disc turns the sharp edges of the emery particles in the friction layer 23 on the outer face of the disc strike the pyrophoric blocks 27 and a train of sparks is produced as the wheel rotates during the progress of the skater. The disc is not positively clamped to the wheel, but can slip more or less should the wheel be rotated too fast. When either of the frictional surfaces of the disc become worn out, a new disc can be readily substituted; also, when the pyrophoric blocks become exhausted, a cross-bar with new blocks can be substituted for the old cross-bar. As these parts can be cheaply made, the substitution of the new parts would be inexpensive. It is obvious that any one or all of the wheels can be provided with the pyrotechnic means.

What I claim is:—

1. In a roller skate, the combination of an axle fixed to the skate and a wheel journaled on the axle with means including a pyrophoric element fixedly mounted on the axle, and friction means carried by the wheel in contact with the pyrophoric element so that rotation of the wheel causes said elements to rub together to produce a pyrotechnic effect.

2. In a roller skate, the combination of an axle fixed to the skate and a wheel journaled on the axle, with a member displaceably mounted on the axle to be held against rotation thereon, a pyrophoric element carried by said member, and friction means carried by the wheel in contact with the pyrophoric element so that rotation of the wheel causes rubbing together of the pyrophoric element and friction means to produce a pyrotechnic effect.

3. In a roller skate, the combination of an axle fixed to the skate and a wheel journaled on the axle with means including a pyrophoric element mounted in the axle to be held against rotation thereon, a disc mounted to rotate between the wheel and pyrophoric element, said disc having a scratching surface to engage the pyrophoric element, and frictional means providing a driving engagement between the disc and wheel so that rotation of the latter turns the disc so that the rubbing contact of the scratching surface with the pyrophoric element produces a pyrotechnic effect.

4. In a roller skate, the combination of an axle fixed to the skate and a wheel journaled on the axle, with a resilient member mounted on the axle, a pyrophoric element carried by the resilient member, friction means carried by the wheel, and means adjustably mounted on the axle for pressing the resilient member toward the wheel to thrust the pyrophoric against the friction means carried by the wheel.

5. In a roller skate, the combination of an axle fixed to the skate and a wheel journaled on the axle, with a resilient cross-bar mounted on the axle, pyrophoric material on the end parts of the cross bar, friction means carried by the wheel, and a washer adjustable on the axle to engage the end parts of the cross-bar to press the pyrophoric material against the friction means carried by the wheel.

6. In a roller skate, the combination of an axle fixed to the skate and a wheel journaled on the axle, with a friction element and a pyrophoric element, one of said elements being attached to a side of the wheel, and a support fixedly mounted on the shaft and carrying the other element to contact with the element attached to the wheel as the latter rotates.

In testimony whereof I affix my signature.

JAMES D. HOOKS.